April 16, 1963 W. C. DUNLAP, JR 3,086,126

SEMICONDUCTOR SWITCHING CIRCUIT

Filed Sept. 16, 1957

INVENTOR.
WILLIAM CRAWFORD DUNLAP JR.

BY Vett Parsigian

ATTORNEY

United States Patent Office 3,086,126
Patented Apr. 16, 1963

3,086,126

SEMICONDUCTOR SWITCHING CIRCUIT

William Crawford Dunlap, Jr., Birmingham, Mich., assignor to The Bendix Corporation, a corporation of Delaware Filed Sept. 16, 1957, Ser. No. 684,228
3 Claims. (Cl. 307—88.5)

This invention relates to a semiconductor switching circuit.

Certain semiconductors when maintained at sufficiently low temperatures, which for germanium may be 4° Kelvin (liquid helium), are subject to an impact ionization phenomenon which occurs at a critical value of voltage or electric field. At such temperatures the residual electrons or holes are bound to their centers or "frozen out" and the semiconductor becomes essentially non-conductive. When the critical voltage is applied to the semiconductor, the residual electrons in the semiconductor are accelerated and collide with impurity atoms at a sufficient speed to ionize these atoms. This results in a cumulative ionization of the remaining impurity atoms and a change of the resistance of the semiconductor from a high value to a substantially lower value. Tests have also shown that an increased value of critical voltage is required to break down the semiconductor when it is subjected to a magnetic field.

The impact ionization phenomenon is one that has been studied very little. However, it appears that it should be characteristic of practically all semiconductors, the only difference among the important semiconductors being as to details, such as the temperatures required and the value of critical voltage or field required to produce the breakdown effect. For example, germanium containing small amounts of the ordinary 3–5 column elements, such as indium, boron, antimony, etc., in amounts ranging roughly from 1 part per billion to 1 part per million, exhibits the impact ionization phenomenon at temperatures below about 12° K., when a field of greater than 1–2 volts/cm. is applied. On the other hand, germanium containing traces of copper, zinc, and platinum, in the same range, exhibits the same impact ionization phenomenon at all temperatures at which the carriers resulting are frozen out, that is below about 30° Kelvin. The field in this case must be increased to about 10 volts/cm. for the impact process to take place. The critical voltage, of course, can be determined for any sample simply from the critical field value and the length of the sample.

Similar values and temperature ranges can be specified for many other impurities, both in germanium and silicon. It will not add significance to the present discussion to attempt to present all the details, but it is expected that the scope of the present invention shall be taken to include all such impurities as properly come within the spirit of the present discussion. Besides silicon and germanium other semiconductors such as silicon carbide, zinc sulfide, cuprous oxide, and other materials may be expected to show the same phenomenon.

This invention relates to a switching circuit which utilizes the above described semiconductor properties. In accordance with the invention a semiconductor in the circuit is subjected to a varying magnetic field so as to change its breakdown voltage. In this way the resistance of the semiconductor is changed from a high value to a low value, so as to cause the current in the circuit and through a load in the circuit to switch from a low value or "off" condition to a high value or "on" condition.

An object of this invention is to provide a switch which depends for its operation upon the impact ionization phenomenon which occurs in certain semiconductors.

Another object is to provide such a switch in which the magnetic field applied to a semiconductor is varied to change the voltage required to break down the resistance of the semiconductor.

Other objects and advantages will become apparent from the following detailed descrpition and from the appended claims and drawings.

Figure 1:
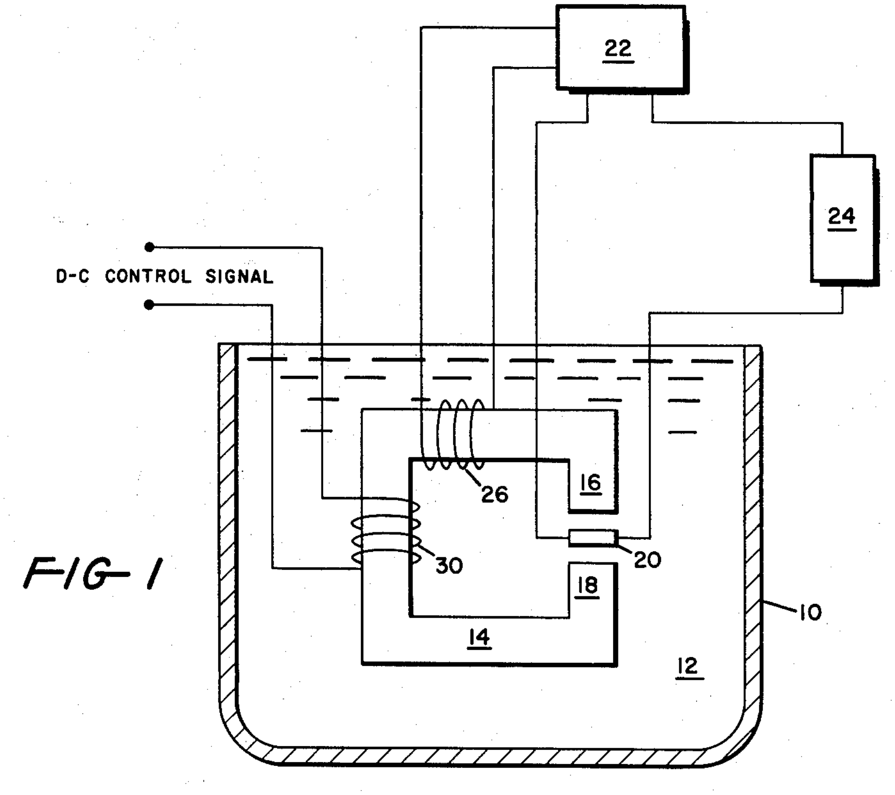
FIGURE 1 shows an embodiment of the invention.

Referring to FIGURE 1, an insulated container 10 may be filled with a liquid refrigerant 12, such as liquid helium, having a temperature of 4° Kelvin. Immersed in the liquid 12 is a core 14 of magnetic material provided with opposing pole pieces 16 and 18. A semiconductor 20, such as a wafer of germanium, is disposed between the pole pieces 16 and 18. The semiconductor 20 contains impurity atoms, such as antimony or gold, and is connected in a circuit including a D.-C. power supply 22 and a suitable load 24.

Figure 2:
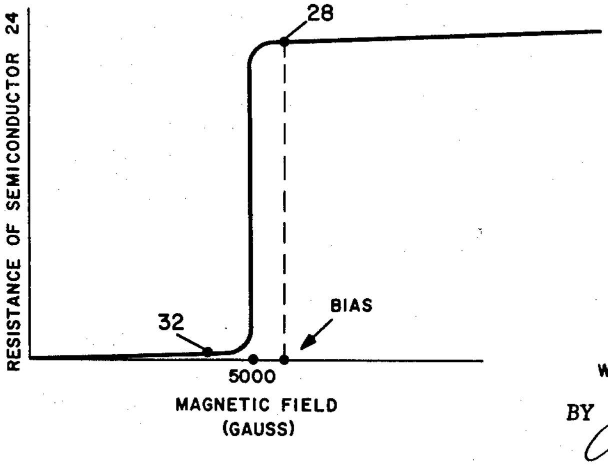
FIGURE 2 is a graph showing the resistance of the semiconductor in FIGURE 1 for different magnetic field values.

A coil 26 is wound on the core 14 and a D.-C. bias is applied to it from the power supply 22. This produces a magnetic field bias of a particular value to which the semiconductor 20 is subjected in the gap between the pole pieces 16 and 18. For example, the magnetic field bias may be at a value greater than 5000 gauss so that the resistance of the semiconductor 20 is maintained at a high value as shown by point 28 on the curve in FIGURE 2, which curve is a plot of the resistance of the wafer 20 versus the magnetic field while maintaining the voltage applied to the semiconductor at a value, such as 200 volts, which would break down the resistance when the magnetic field is reduced to 5000 gauss or less.

A coil 30 is also wound on the core 14 and is connected to receive a D.-C. control signal from an external source. The D.-C. signal applied to the coil 30 is in a direction to produce a flux opposing the flux produced by the coil 26 and of sufficient magnitude to reduce the total flux to a value less than that required to break down the resistance of the semiconductor 20. For example, each time the control signal is applied to the coil 30, the magnetic field in the gap between the pole pieces 16 and 18 is reduced to a value less than 5000 gauss and the resistance of the semiconductor is reduced to a low value as shown by point 32 in FIGURE 2.

Therefore, the resistance of the semiconductor 20 is reduced from a high value at 28 to a low value at 32 each time a signal is applied to the coil 30. This causes the current through the load 24 to change from a low value or "off" condition to a high value or "on" condition. When the signal is removed from the coil 30, the resistance of the semiconductor 20 returns to its high value at 28 and the current through the load is again reduced to a low value.

The switch disclosed above would be very useful as a binary computing element. It is simple and reliable in its operation and includes a minimum number of components. Also, it can be very compactly constructed.

Having thus described my invention, I claim:

1. A switching circuit, including, a semiconductor in the circuit, means for maintaining the semiconductor at a sufficiently low temperature to make it non-conductive, a voltage source in the circuit for applying to the semiconductor a voltage of particular magnitude sufficient to produce impact ionization in the semiconductor and a resultant breakdown of its resistance, means for subjecting the semiconductor to a magnetic field of sufficient magnitude to prevent impact ionization in the semiconductor at the applied voltage of particular magnitude, and means for reducing the magnetic field upon each application of a control signal to produce impact ionization in the semiconductor so as to switch the current in the circuit from a low value to a high value.

2. A switching circuit, including, a semiconductor connected in the circuit, means for maintaining the semiconductor at a sufficiently low temperature to make it non-conductive, a voltage source in the circuit for applying to the semiconductor a voltage of particular magnitude to produce impact ionization in the semiconductor, means for subjecting the semiconductor to a biasing magnetic field of a magnitude to prevent impact ionization at the applied voltage of particular magnitude, and means for reducing the magnetic field in accordance with a control signal to produce impact ionization in the semiconductor and a resultant breakdown of the resistance of the semiconductor to a low value.

3. A switching circuit, including, a semiconductor in the circuit, means for maintaining the semiconductor at a sufficiently low temperature to make it non-conductive, a voltage source in the circuit for applying to the semicondutcor a voltage of particular magnitude sufficient to produce impact ionization in the semiconductor, a core of magnetic material having a pair of pole pieces facing each other, the semiconductor being disposed in the gap between the pole pieces, a first coil wound on the core for producing, upon the application of a voltage to the coil, a biasing magnetic field in the gap to prevent impact ionization in the semiconductor at the voltage of particular magnitude, a second coil wound on the core for reducing the magnetic field in the gap upon each application of a control signal to the coil to produce impact ionization in the semiconductor so as to switch the current in the circuit from an "off" condition to an "on" condition.

References Cited in the file of this patent

UNITED STATES PATENTS

| | | |
|---|---|---|
| 2,666,884 | Ericsson et al. | Jan. 19, 1954 |
| 2,695,930 | Wallace | Nov. 30, 1954 |
| 2,725,474 | Ericsson et al. | Nov. 29, 1955 |
| 2,774,890 | Semmelman | Dec. 18, 1956 |
| 2,832,897 | Buck | Apr. 29, 1958 |
| 2,869,001 | Welker | Jan. 13, 1959 |

OTHER REFERENCES

"Impact Ionization of Impurities in Germanium," from J. Phys. Chem. Solids, Pergamon Press, 1957, vol. 2, pp. 1–23, March 1957.